United States Patent Office 3,040,050
Patented June 19, 1962

3,040,050
1-(BETA-PHENYL-HYDROXYETHYL)-2-IMINO-1,2-DIHYDROPYRIDINE AND HYDROCHLORIDE
John H. Biel, Milwaukee, Wis., assignor to Lakeside Laboratories, Inc., Milwaukee, Wis., a corporation of Delaware
No Drawing. Filed Mar. 1, 1960, Ser. No. 11,979
2 Claims. (Cl. 260—296)

This invention relates to novel chemical compounds and processes of producing the same. More particularly, this invention is concerned with novel heterocyclic phenethanolamines, processes of producing the same and uses therefor.

According to the present invention there are provided novel heterocyclic phenethanolamines of the formulae A. 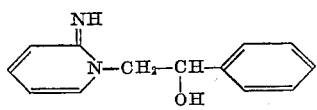

1-(beta-phenyl-beta-hydroxyethyl)-2-imino-1,2-dihydropyridine

B. 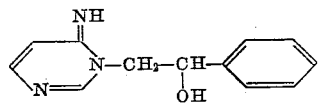

1-(beta-phenyl-beta-hydroxyethyl)-2-imino-1,2-dihydropyrimidine

C. 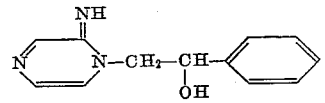

1-(beta-phenyl-beta-hydroxyethyl)-2-imino-1,2-dihydropyrazine

D. 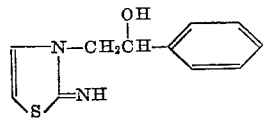

2-imino-3-(beta-phenyl-beta-hydroxyethyl)-2,3-dihydrothiazole

E. 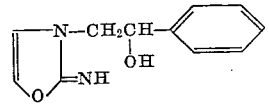

1-(beta-phenyl-beta-hydroxyethyl)-3-(2-imino-2,3-dihydro)-oxazole

F. 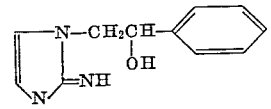

2-imino-3-(beta-phenyl-beta-hydroxyethyl)-2,3-dihydroimidazole and nontoxic acid addition salts thereof.

The compounds provided by this invention can be produced by reacting the appropriate 2-amino heterocyclic compound with styrene oxide. This reaction can be represented as follows in which 2-aminopyridine is the specific 2-amino heterocyclic compound:

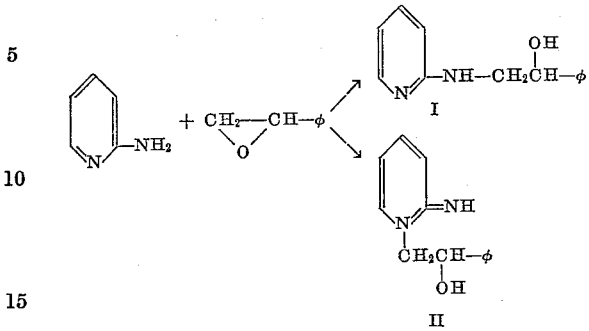

wherein φ is the phenyl group. The reaction shows the possible formation of two tautomeric isomers. This is because 2-aminopyridine exists in tautomeric equilibrium as follows:

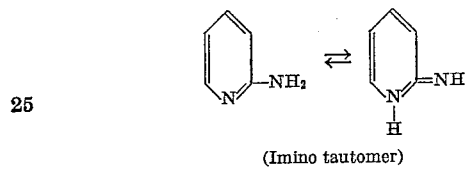

(Imino tautomer)

Similarly, the other reactants 2-aminothiazole, 2-aminopyrimidine, 2-aminopyrazine, 2-aminooxazoline and 2-aminoimidazoline also exist as equilibrium mixtures of such tautomeric forms and thus could lead to isomeric reaction products comparable to those for 2-aminopyridine shown in Formulas I and II above. However, under the reaction conditions described hereinafter the imino structure is favored and is supported by analogy with the reaction of ethylene oxide and 2-aminopyridine. Ber. 68B, 397 (1935); C.A. 29, 3339 (1935).

The reaction between the 2-amino heterocyclic compound and styrene oxide can be effected by bringing the reactants into intimate contact with each other in a suitable liquid reaction medium. A lower alcohol such as methanol or ethanol can be used for the reaction medium. The reaction proceeds at room temperature and can be terminated with the production of acceptable yields in about three to six hours. Longer times can be used, if desired, to bring the reaction to greater completion.

An alkali metal amide such as lithium amide or sodamide can be used in a small amount to catalyze the reaction but with such agents an anhydrous reaction medium such as toluene or ethylene glycol dimethyl ether must be used. Under such conditions the reaction also proceeds at room temperature but elevated temperatures such as the reflux temperature can be used to increase the reaction rate if desired.

The desired product is readily separated from the reaction mixture by conventional means.

Acid addition salts of the novel compounds of this invention are produced by contacting them with a suitable acid such as a mineral acid like sulfuric acid or hydrochloric acid, or an organic acid such as formic acid, citric acid, fumaric acid and maleic acid.

The described compounds, advisably in the form of nontoxic acid addition salts, exert central nervous system stimulating action in animals and humans but have a negligible effect on the cardiovascular system. In addition, the compounds have analgetic and muscle relaxant activity. The compounds also sensitize animals to epinephrine, which is a property exhibited by the antidepressant Tofranil. The oral route of administration is recommended.

The compounds, advisably in the form of a nontoxic acid addition salt, can be administered to animals and humans as pure compounds. However, in order to obtain a more satisfactory volume to dosage relationship, the compounds are generally formulated with a suitable pharmaceutical carrier such as starch, sugar, talc or water. The compositions then can be converted into suitable unit-dosage forms such as tablets and capsules. A dosage of 50 to 300 mgm. per day is usually a satisfactory total dosage so that the unit-dosage forms can be formulated containing gradient amounts of the active agent so that spaced administration throughout the day will give the total administration desired.

A typical tablet can have the composition:

| | | Mg. |
|---|---|---|
| (1) | 1-(beta-phenyl-beta-hydroxyethyl)-2-imino-1,2-dihydropyridine HCl | 30 |
| (2) | Starch U.S.P. | 57 |
| (3) | Lactose U.S.P. | 73 |
| (4) | Talc U.S.P. | 9 |
| (5) | Stearic acid | 6 |

The following examples illustrate the preparation of some of the compounds of this invention.

EXAMPLE 1

*1-(Beta-Phenyl-Beta-Hydroxyethyl)-2-Imino-1,2-Dihydropyridine*

A mixture containing 18.8 g. (0.20 mole) of 2-aminopyridine, 0.55 g. of lithium amide and 75 cc. of anhydrous toluene was refluxed for 1.5 hours. Styrene oxide (12.0 g.=0.10 mole) was then added to the reaction mixture with stirring over a period of ten minutes. The reaction mixture was stirred and refluxed for an additional 3.5 hours. A crystalline precipitate was formed during the reaction which was removed by filtration, M.P. 170–171° C., 1.5 g. The filtrate was concentrated to dryness and a dark residue remained which was crystallized from anhydrous ether; yield 6.0 g. Upon recrystallization of the crude solid from 30 cc. of isopropyl alcohol, 2.0 g. of a light yellow solid was isolated; M.P. 170–171° C.

EXAMPLE 2

*1-(Beta-Phenyl-Beta-Hydroxyethyl)-2-Imino-1,2-Dihydropyridine Hydrochloride*

Two grams of the product of Example 1 (M.P. 170–171° C.) was dissolved in isopropyl alcohol and converted to the hydrochloride salt by neutralization with ethereal hydrochloric acid, yield 2.2 g. (93%), M.P. 199–200° C.

*Anal.*—Calcd. for $C_{13}H_{15}ClN_2O$: Cl, 14.17. Found: Cl, 14.18.

EXAMPLE 3

*1-(Beta-Phenyl-Beta-Hydroxyethyl)-2-Imino-1,2-Dihydropyridine*

This compound was also obtained by allowing an ethanol solution of 24.0 g. (0.20 mole) of styrene oxide and 17.1 g. (0.18 mole) 2-aminopyridine to stand at room temperature for four days. The yield of yellow, crystalline product was 9.0 g. (23%), M.P. 168–170° C. The hydrochloride salt melted at 200–201° C.

EXAMPLE 4

*2-Imino-3-(Beta-Phenyl-Beta-Hydroxyethyl)-2,3-Dihydrothiazole*

An ethanol solution containing 18 g. (0.18 mole) of 2-aminothiazole and 24 g. (0.20 mole) of styrene oxide was allowed to stand at room temperature for 4 days; 9.3 g. (24%) of a light grey precipitate was collected, M.P. 159–160° C., which on recrystallization from isopropyl alcohol (3 g. in 75 cc.) melted at 167–168° C.

EXAMPLE 5

*2-Imino-3-(Beta-Phenyl-Beta-Hydroxyethyl)-2,3-Dihydrothiazole Hydrochloride*

Six g. (0.027 mole) of the recrystallized base from Example 4 was dissolved in 200 cc. of isopropyl alcohol and neutralized with 22 cc. of 2.36 N ethereal hydrochloric acid, yield 6.4 g. (92%); M.P. 208–209° C.

*Anal.*—Calcd. for $C_{11}H_{13}ClN_2OS$: Cl⁻, 13.84. Found: Cl⁻, 13.84.

Various changes and modifications of the invention can be made and, to the extent that such variations incorporate the spirit of this invention, they are intended to be included within the scope of the appended claims.

What is claimed is:

1. 1-(beta-phenyl-beta-hydroxyethyl)-2-imino-1,2-dihydropyridine.

2. 1-(beta-phenyl-beta-hydroxyethyl)-2-imino-1,2-dihydropyridine hydrochloride.

References Cited in the file of this patent

UNITED STATES PATENTS 2,946,793     Michaels et al.          July 26, 1960

OTHER REFERENCES

Knunanz: Ber. Deut. Chem., vol 68, pages 397–8 (1935).

Yur'ev et al.: Chem. Abstracts, vol. 49, column 7556 (1955).

Yur'ev et al.: Chem. Abstracts, vol. 50, column 4940 (1956).

Elderfield: Heterocyclic Compounds, vol. 5, pages 243, 386 (1957).

Ziegenbein et al.: Chem. Ber., vol. 90, pages 2291–2301 (1957).